(12) United States Patent
Shin et al.

(10) Patent No.: US 12,202,944 B2
(45) Date of Patent: *Jan. 21, 2025

(54) HEAT SHRINKABLE FILM AND METHOD FOR REPRODUCING POLYESTER CONTAINER USING SAME

(71) Applicants: SK microworks Co., Ltd., Gyeonggi-do (KR); SK microworks America, Inc., Covington, GA (US)

(72) Inventors: Daeyong Shin, Sugar Hill, GA (US); Yongdeuk Kim, Jeollanam-do (KR); Jung Kyu Lee, Seoul (KR); Jaehyong Son, Snellville, GA (US); Eugene Jung, Lawrenceville, GA (US)

(73) Assignees: SK MICROWORKS AMERICA, INC., Covington, GA (US); SK MICROWORKS CO., LTD., Gyeonggi-Do (KR)

( * ) Notice: Subject to any disclaimer, the term of this patent is extended or adjusted under 35 U.S.C. 154(b) by 648 days.

This patent is subject to a terminal disclaimer.

(21) Appl. No.: 17/499,112

(22) Filed: Oct. 12, 2021

(65) Prior Publication Data

US 2022/0025112 A1 Jan. 27, 2022

Related U.S. Application Data

(60) Continuation-in-part of application No. 17/231,844, filed on Apr. 15, 2021, now abandoned, which is a continuation of application No. 16/687,357, filed on Nov. 18, 2019, now Pat. No. 11,008,434, which is a division of application No. 16/355,483, filed on Mar. 15, 2019, now Pat. No. 10,800,897.

(60) Provisional application No. 62/664,543, filed on Apr. 30, 2018.

(51) Int. Cl.
| | |
|---|---|
| B29B 9/04 | (2006.01) |
| B29B 17/04 | (2006.01) |
| B29C 61/02 | (2006.01) |
| C08G 63/183 | (2006.01) |
| C08G 63/672 | (2006.01) |
| C08J 5/18 | (2006.01) |
| C08J 11/12 | (2006.01) |
| B29L 9/00 | (2006.01) |

(52) U.S. Cl.
CPC .......... *C08J 11/12* (2013.01); *B29B 9/04* (2013.01); *B29B 17/04* (2013.01); *B29C 61/02* (2013.01); *C08G 63/183* (2013.01); *C08G 63/672* (2013.01); *C08J 5/18* (2013.01); *B29L 2009/00* (2013.01); *C08G 2390/00* (2013.01); *C08J 2367/02* (2013.01); *C08J 2367/03* (2013.01)

(58) Field of Classification Search
USPC .................................. 528/190.193, 271.272
See application file for complete search history.

(56) References Cited

U.S. PATENT DOCUMENTS

| | | | |
|---|---|---|---|
| 5,968,666 | A | 10/1999 | Carter et al. |
| 2011/0224369 | A1 | 9/2011 | Kim et al. |
| 2013/0274434 | A1 | 10/2013 | Kim et al. |
| 2019/0375552 | A1 | 12/2019 | Haruta et al. |
| 2021/0108027 | A1 | 4/2021 | Minami et al. |

FOREIGN PATENT DOCUMENTS

| | | | |
|---|---|---|---|
| CN | 1213340 | A | 4/1999 |
| JP | H6-155574 | A | 6/1994 |
| JP | 2006-264136 | A | 10/2006 |
| JP | 2013-209246 | A | 10/2013 |
| TW | 201139531 | A1 | 11/2011 |
| TW | 201217429 | A1 | 5/2012 |
| TW | 201835150 | A | 10/2018 |
| TW | 201900720 | A | 1/2019 |

OTHER PUBLICATIONS

Sleeve Label Ink and Substrate for PET Bottles Critical Guidance Document, Nov. 2, 2012, p. 1-19, Association of Postconsumer Plastic Recyclers.

Invalidation Action for the Taiwanese Patent No. 1720541 (Application No. 108124728) issued by the Taiwanese 2 Patent Office on Oct. 5, 2022.

Akihiko Toda, Heating rate dependence of melting peak temperature examined by DSC of heat flux type, Journal of Thermal Analysis and Calorimetry, vol. 123, No. 3, Mar. 28, 2015, pp. 1795-1808, Springer.

Office Action for the European Patent Application No. 21188707.0 issued by the European Patent Office on Oct. 19, 2022.

*Primary Examiner* — Terressa Boykin
(74) *Attorney, Agent, or Firm* — IP & T GROUP LLP

(57) ABSTRACT

The embodiments relate to a heat shrinkable film and a process for regenerating a polyester container using the same. The heat shrinkable film comprises a copolymerized polyester resin comprising a diol component and a dicarboxylic acid component and has a heat shrinkage rate of 30% or more in the main shrinkage direction upon thermal treatment at a temperature of 80° C. for 10 seconds, a melting point of 190° C. or higher as measured by differential scanning calorimetry, and a peak temperature (Tp) of 95° C. to 115° C. as measured in the endothermic and exothermic curve (heat flow) by differential scanning calorimetry. It not only solves the environmental problem by improving the recyclability of the polyester container, but also is capable of enhancing the yield and productivity.

9 Claims, 3 Drawing Sheets

[Fig. 1]
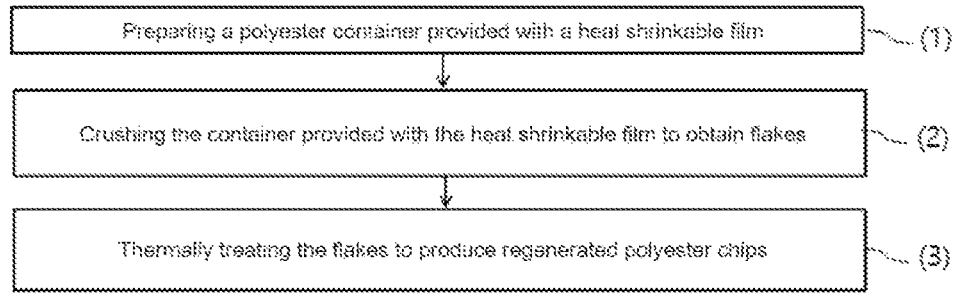
[Fig. 2]
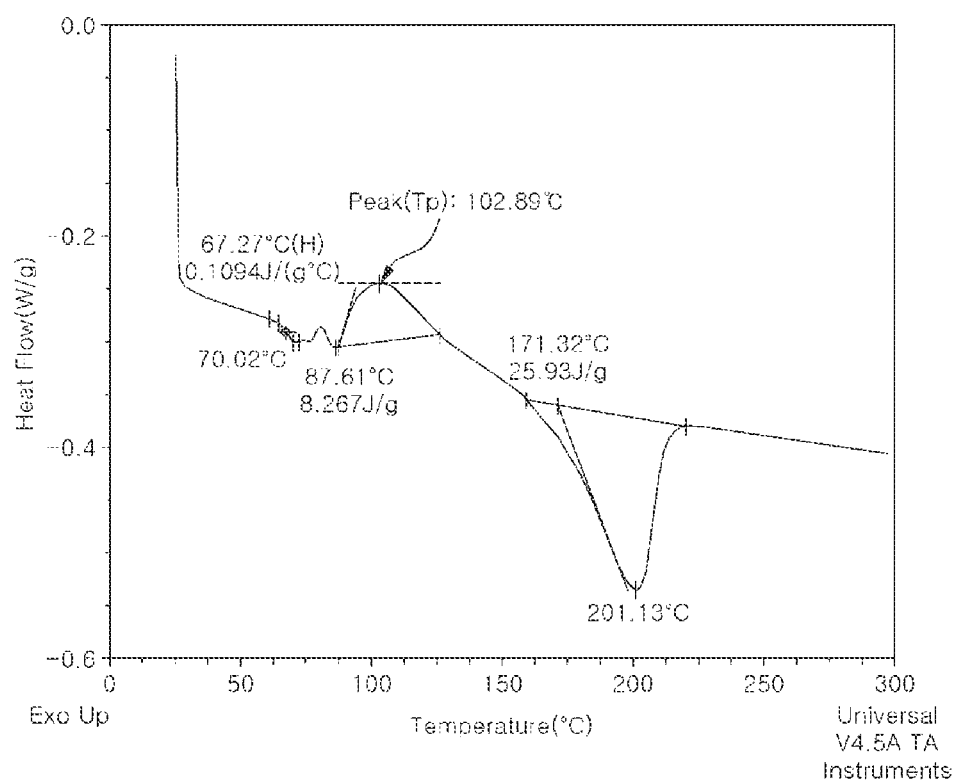

[Fig. 3]
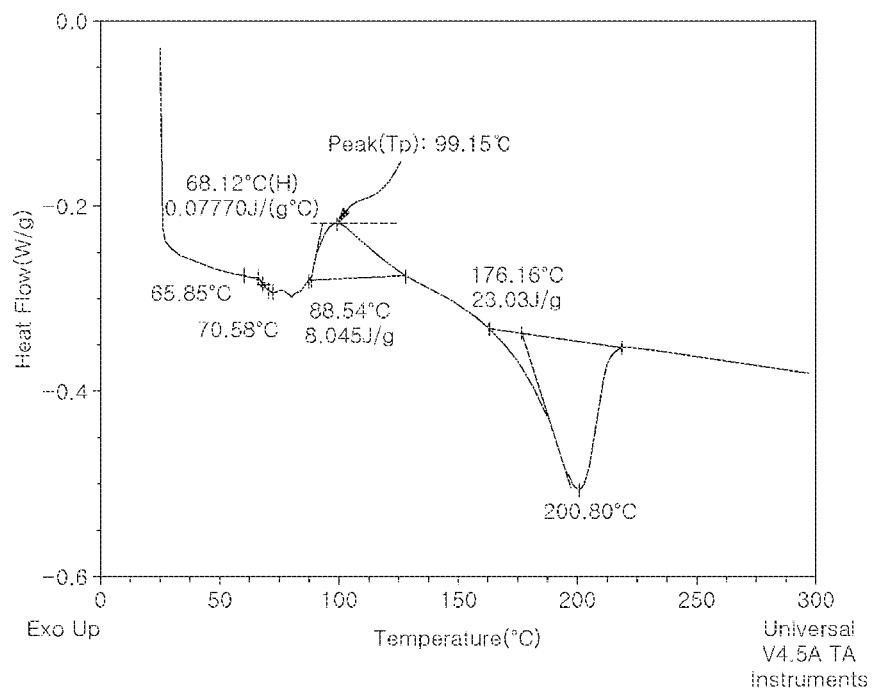
[Fig. 4]
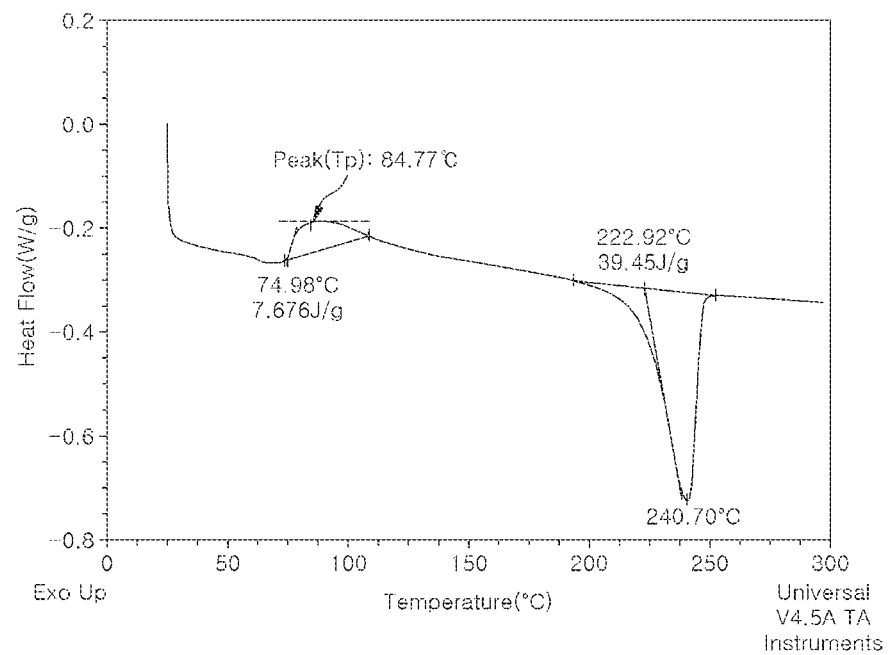

[Fig. 5]
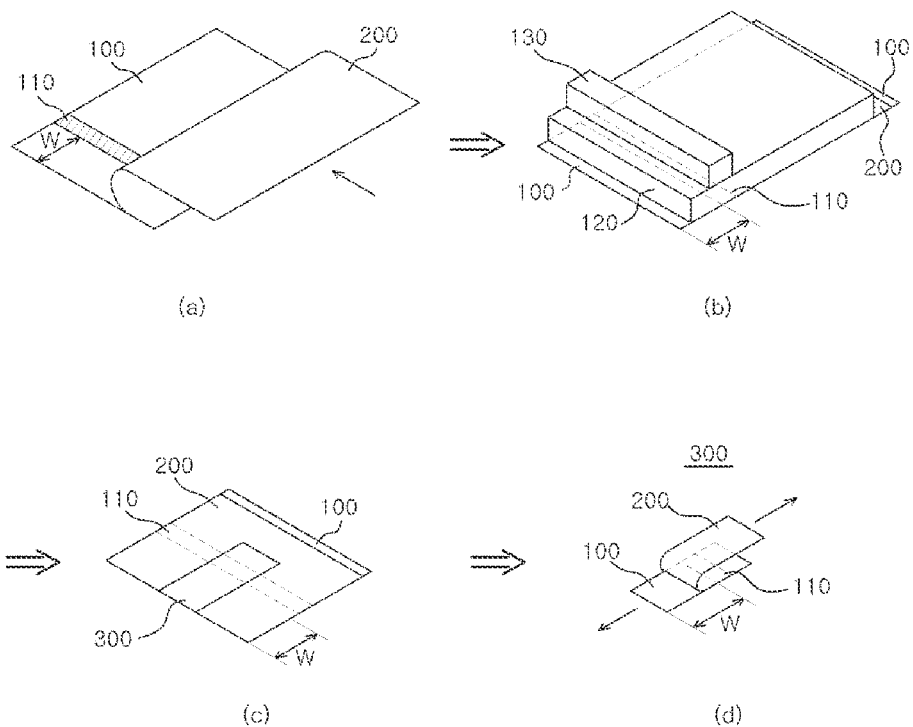

HEAT SHRINKABLE FILM AND METHOD FOR REPRODUCING POLYESTER CONTAINER USING SAME

CROSS-REFERENCE TO RELATED APPLICATION

This application is a continuation-in-part of U.S. patent application Ser. No. 17/231,844 filed on Apr. 15, 2021, which is a continuation of U.S. patent application Ser. No. 16/687,357 filed on Nov. 18, 2019 and issued as U.S. Pat. No. 11,008,434 on May 18, 2021, which is a division of U.S. patent application Ser. No. 16/355,483 filed on Mar. 15, 2019 and issued as U.S. Pat. No. 10,800,897 on Oct. 13, 2020, which claims the benefit of U.S. Provisional Patent Application Ser. No. 62/664,543 filed on Apr. 30, 2018. The disclosure of each of the foregoing application is incorporated herein by reference in its entirety.

TECHNICAL FIELD

Embodiments relate to a heat shrinkable film and to a process for regenerating a polyester container using the same, which not only solve the environmental problems by improving the recyclability of the polyester container, but also are capable of enhancing the yield and productivity.

BACKGROUND ART

As concerns about environmental problems have increased in recent years, there is a demand for addressing the recycling issues of products fabricated using thermoplastic polymers. In particular, polyethylene terephthalate, a thermoplastic resin having excellent properties in terms of thermal resistivity, processability, transparency, and non-toxicity, has been widely used for producing a wide range of products such as films, fibers, bottles, and containers, and the like, and efforts have been made to improve the regeneration rate thereof.

In general, a stretched film of polyolefin or the like is attached as a label to a container produced from polyethylene terephthalate. Thus, once a container recycled from the consumers is washed and crushed, it is then subjected to liquid specific gravity separation, dehydration, drying, and/or wind specific gravity separation in order to remove a large amount of films contained in the crushed product and then to such an additional step as pelletization to obtain regenerated chips. However, there has been a disadvantage in that the regenerated chips are colored or clumped during the thermal treatment of the regenerated chips due to the inks and the films that have not been removed even after the above steps. Thus, in order to increase the regeneration rate of containers, it is important to prevent inks and films from being mixed with the containers.

Accordingly, a method of using a film made of a low specific gravity polymer such as polystyrene, polyethylene, polypropylene, and the like has been proposed in order to readily carry out the specific gravity separation. However, the low specific gravity thereof cannot be effectively achieved due to the influence of the ink layer, which makes it difficult to completely separate the film, and the problem that the residual ink colors the regenerated chips cannot be solved.

DETAILED DESCRIPTION OF THE INVENTION

Technical Problem

Accordingly, the embodiments aim to provide a heat shrinkable film capable of effectively separating inks and films during a regeneration process, thereby improving the recyclability of a polyester container, and a process for regenerating a polyester container using the same.

Solution to the Problem

According to an embodiment, there is provided a heat shrinkable film, which comprises a copolymerized polyester resin comprising a diol component and a dicarboxylic acid component, and which has a heat shrinkage rate of 30% or more in the main shrinkage direction upon thermal treatment at a temperature of 80° C. for 10 seconds, a melting point of 190° C. or higher as measured by differential scanning calorimetry, and a peak temperature (Tp) of 95° C. to 115° C. as measured in the endothermic and exothermic curve (heat flow) by differential scanning calorimetry.

According to an embodiment, there is provided a process for regenerating a polyester container, which comprises preparing the polyester container provided with the heat shrinkable film; crushing the container provided with the heat shrinkable film to obtain flakes; and thermally treating the flakes to produce regenerated polyester chips, wherein the flakes comprise first flakes obtained by crushing the container and second flakes obtained by crushing the heat shrinkable film.

Advantageous Effects of the Invention

The heat shrinkable film according to an embodiment improves the recyclability of a polyester container, thereby solving the environmental problems and enhancing the yield and productivity.

Specifically, as the heat shrinkable film satisfies the preferred ranges of melting point and peak temperature, it is excellent in peel strength, that is, adhesive strength after the seaming process, whereby it is suitable for application as a heat shrinkable film. Since the clumping fraction of regenerated polyester chips manufactured using it is very low, it is possible to enhance the recyclability while preventing environmental pollution.

In addition, the process for regenerating a polyester container according to an embodiment does not require a separate step of separating the polyester container and a film, thereby saving time and cost.

BRIEF DESCRIPTION OF THE DRAWING

FIG. 1 schematically depicts a process for regenerating a polyester container according to an embodiment.

FIG. 2 shows the results of differential scanning calorimeter (DSC) measurement of the heat shrinkable film of Example 1.

FIG. 3 shows the results of DSC measurement of the heat shrinkable film of Example 3.

FIG. 4 shows the results of DSC measurement of the heat shrinkable film of Comparative Example 2.

FIG. 5 shows a method of measuring the peel strength of a heat shrinkable film.

EXPLANATION OF REFERENCE NUMERALS w: length to the adhesive part
100: first heat shrinkable film
110: adhesive part
120: pressing plate
130: weight
200: second heat shrinkable film
300: sample A

BEST MODE FOR CARRYING OUT THE INVENTION

Hereinafter, the present invention will be described in detail with reference to embodiments. The embodiments are not limited to those described below. Rather, they can be modified into various forms as long as the gist of the invention is not altered.

Throughout the present specification, when a part is referred to as "comprising" an element, it is understood that other elements may be comprised, rather than other elements are excluded, unless specifically stated otherwise.

All numbers and expressions related to the quantities of components, reaction conditions, and the like used herein are to be understood as being modified by the term "about," unless otherwise indicated.

Heat Shrinkable Film

According to an embodiment, there is provided a heat shrinkable film, which comprises a copolymerized polyester resin comprising a diol component and a dicarboxylic acid component, and which has a heat shrinkage rate of 30% or more in the main shrinkage direction upon thermal treatment at a temperature of 80° C. for 10 seconds, a melting point of 190° C. or higher as measured by differential scanning calorimetry, and a peak temperature (Tp) of 95° C. to 115° C. as measured in the endothermic and exothermic curve (heat flow) by differential scanning calorimetry.

According to an embodiment, there is provided a heat shrinkable film, which comprises a copolymerized polyester resin comprising a diol component and a dicarboxylic acid component, and which has a heat shrinkage rate of 30% or more in the main shrinkage direction upon thermal treatment at a temperature of 80° C. for 10 seconds, a crystallization temperature that is not measured or is 70° C. to 95° C. by differential scanning calorimetry, and a peak temperature (Tp) of 95° C. to 115° C. as measured in the endothermic and exothermic curve (heat flow) by differential scanning calorimetry.

According to an embodiment, the copolymerized polyester resin comprises a diol component and a dicarboxylic acid component.

The diol component is composed of a linear or branched $C_2$ to $C_{10}$ diol. That is, the diol component does not comprise an alicyclic diol or an aromatic diol.

For example, the linear or branched $C_2$ to $C_{10}$ diol may comprise a derivative of ethylene glycol, diethylene glycol, neopentyl glycol, 1,3-propanediol, 1,2-octanediol, 1,3-octanediol, 2,3-butanediol, 1,3-butanediol, 1,4-butanediol, 1,5-pentanediol, 2-butyl-2-ethyl-1,3-propanediol, 2,2-diethyl-1,5-pentanediol, 2,4-diethyl-1,5-pentanediol, 3-methyl-1,5-pentanediol, 1,1-dimethyl-1,5-pentanediol, 1,6-hexanediol, 2-ethyl-3-methyl-1,5-hexanediol, 2-ethyl-3-ethyl-1,5-hexanediol, 1,7-heptanediol, 2-ethyl-3-methyl-1,5-heptanediol, 2-ethyl-3-ethyl-1,6-heptanediol, 1,8-octanediol, 1,9-nonanediol, 1,10-decanediol, or a combination thereof. But it is not limited thereto.

According to an embodiment, the diol component may comprise at least one selected from the group consisting of ethylene glycol, diethylene glycol, cyclohexanedimethanol (CHDM), propanediol unsubstituted or substituted with an alkyl group, butanediol unsubstituted or substituted with an alkyl group, pentanediol unsubstituted or substituted with an alkyl group, hexanediol unsubstituted or substituted with an alkyl group, octanediol unsubstituted or substituted with an alkyl group, and a combination thereof.

According to an embodiment, the diol component may comprise ethylene glycol, diethylene glycol, 1,4-cyclohexanedimethanol, 1,3-propanediol, 1,2-octanediol, 1,3-octanediol, 2,3-butanediol, 1,3-butanediol, 1,4-butanediol, 1,5-pentanediol, neopentyl glycol, 2-butyl-2-ethyl-1,3-propanediol, 2,2-diethyl-1,5-pentanediol, 2,4-diethyl-1,5-pentanediol, 3-methyl-1,5-pentanediol, 1,1-dimethyl-1,5-pentanediol, or a combination thereof.

According to an embodiment, the diol component may be at least one selected from the group consisting of ethylene glycol, diethylene glycol, neopentyl glycol, and cyclohexanedimethanol.

The dicarboxylic acid component may be selected from the group consisting of an aromatic dicarboxylic acid such as terephthalic acid, dimethylterephthalic acid, isophthalic acid, naphthalene dicarboxylic acid, orthophthalic acid, and the like; an aliphatic dicarboxylic acid such as adipic acid, azelaic acid, sebacic acid, decanedicarboxylic acid, and the like; an alicyclic dicarboxylic acid; an ester thereof; and a combination thereof. Specifically, the dicarboxylic acid component may be composed of terephthalic acid, dimethylterephthalic acid, isophthalic acid, naphthalene dicarboxylic acid, orthophthalic acid, or a combination thereof.

According to an embodiment, the dicarboxylic acid component may comprise an aromatic dicarboxylic acid. For example, the dicarboxylic acid component may comprise at least 80% by mole, at least 90% by mole, or at least 95% by mole of terephthalic acid, based on the total number of moles of the dicarboxylic acid component.

According to an embodiment, the copolymerized polyester resin may comprise neopentyl glycol in an amount of 5 to 35% by mole based on the total number of moles of the diol component. For example, the copolymerized polyester resin may comprise neopentyl glycol in an amount of 5 to 30% by mole, 7 to 30% by mole, 10 to 25% by mole, or 10 to 20% by mole, based on the total number of moles of the diol component. If the above range is satisfied, a heat shrinkable film having a heat shrinkage rate in the direction perpendicular to the main shrinkage direction that is not high even at a high temperature can be prepared. In particular, if the content of neopentyl glycol exceeds the above range, the film may excessively expand in the direction perpendicular to the main shrinkage direction, so that wrinkles or deformation may occur when the film is applied to a container. In addition, if the content of neopentyl glycol is less than the above range, the amorphous region is unnecessarily large, whereby the expansion coefficient would be increased due to low shrinkage characteristics in the direction perpendicular to the main shrinkage direction although the shrinkage characteristics in the main shrinkage direction could be improved.

According to an embodiment, the copolymerized polyester resin may comprise ethylene glycol in an amount of 55 to 93% by mole based on the total number of moles of the diol component. For example, the copolymerized polyester resin may comprise ethylene glycol in an amount of 60 to 90% by mole, 70 to 90% by mole, or 75 to 85% by mole, based on the total number of moles of the diol component. If the above range is satisfied, the heat shrinkage rate can be enhanced, and the clumping fraction can be reduced.

According to an embodiment, the copolymerized polyester resin may comprise diethylene glycol in an amount of 0 to 20% by mole based on the total number of moles of the diol component. For example, the copolymerized polyester resin may comprise diethylene glycol in an amount of 0 to 15% by mole, 1 to 13% by mole, 1 to 10% by mole, or 2 to 10% by mole, based on the total number of moles of the diol component. If the above range is satisfied, the heat shrinkage rate can be enhanced, and the clumping fraction can be reduced.

According to an embodiment, the copolymerized resin may comprise cyclohexanedimethanol in an amount of 0 to 30% by mole based on the total number of moles of the diol component. For example, the copolymerized polyester resin may comprise cyclohexanedimethanol in an amount of 10 to 30% by mole, 20 to 30% by mole, or 22 to 30% by mole, based on the total number of moles of the diol component.

According to an embodiment, the polyester resin comprises a dicarboxylic acid component and a diol component, wherein the dicarboxylic acid component may be composed of terephthalic acid, and the diol component may be composed of (i) neopentyl glycol and (ii) ethylene glycol, diethylene glycol, or a combination thereof. Specifically, the dicarboxylic acid component may be composed of terephthalic acid, and the diol component may be composed of (i) neopentyl glycol and (ii) ethylene glycol. Alternatively, the dicarboxylic acid component may be composed of terephthalic acid, and the diol component may be composed of neopentyl glycol.

If the dicarboxylic acid component in the polyester resin is composed of terephthalic acid and if the diol component therein is composed of (i) neopentyl glycol and (ii) ethylene glycol, diethylene glycol, or a combination thereof, the polyester resin may have a reduced whitening phenomenon and a low haze of 15% or less and is excellent in dimensional stability.

The diol component may further comprise a monohydric alcohol. For example, it may further comprise isopropyl alcohol. Specifically, the copolymerized polyester resin may comprise a monohydric alcohol in an amount of 15 to 30% by mole, 18 to 25% by mole, or 20 to 25% by mole, based on the total number of moles of the diol component. But it is not limited thereto.

The dicarboxylic acid and the diol as described above are subjected to a transesterification reaction and then polymerization to thereby form a copolymerized polyester resin. Specifically, at least one catalyst selected from manganese acetate, calcium acetate, and zinc acetate may be used as a catalyst for the transesterification reaction. The content of the catalyst may be 0.02 to 0.2% by weight based on the total weight of the dicarboxylic acid compound. Upon completion of the transesterification reaction, at least one additive selected from silica, potassium, and magnesium; a stabilizer such as trimethyl phosphate; a polymerization catalyst selected from antimony trioxide and tetrabutylene titanate; and the like may be selectively added to carry out the reaction, to thereby prepare a copolymerized polyester resin composition.

According to an embodiment, the heat shrinkable film has a heat shrinkage rate of 30% or more in the main shrinkage direction upon thermal treatment at a temperature of 80° C. for 10 seconds. For example, the heat shrinkable film may have a heat shrinkage rate of 40% or more, 45% or more, 50% or more, 30% to 85%, 40% to 80%, or 50% to 80%, in the main shrinkage direction upon thermal treatment at a temperature of 80° C. for 10 seconds. It may be 30% to 85%, 35% to 83%, 40% to 80%, 42% to 75%, or 45% to 72%. If the above range is satisfied, it is easy to attach and label the heat shrinkable film on the surface of a container. The main shrinkage direction may be the transverse direction.

In addition, the heat shrinkable film may have a heat shrinkage rate of −10% to 10% in the direction perpendicular to the main shrinkage direction upon thermal treatment at a temperature of 80° C. for 10 seconds. For example, the heat shrinkable film may have a heat shrinkage rate of −8% to 9%, −5% to 6%, −4% to 5%, −3% to 3.5%, or −2% to 3%, in the direction perpendicular to the main shrinkage direction upon thermal treatment at a temperature of 80° C. for 10 seconds.

The heat shrinkable film may have a heat shrinkage rate of 5% to 55% in the main shrinkage direction upon thermal treatment at a temperature of 70° C. for 10 seconds. For example, the heat shrinkable film may have a heat shrinkage rate of 5% to 50%, 10% to 50%, 20% to 45%, or 25% to 40%, in the main shrinkage direction upon thermal treatment at a temperature of 70° C. for 10 seconds. If the above range is satisfied, it is easy to attach and label the heat shrinkable film on the surface of a container.

In addition, the heat shrinkable film may have a heat shrinkage rate of −10% to 10% in the direction perpendicular to the main shrinkage direction upon thermal treatment at a temperature of 70° C. for 10 seconds. For example, the heat shrinkable film may have a heat shrinkage rate of −9% to 8%, −8% to 6%, −7% to 4%, −6% to 2.5%, −5% to 1.5%, or −4.5% to 0.5%, in the direction perpendicular to the main shrinkage direction upon thermal treatment at a temperature of 70° C. for 10 seconds.

The heat shrinkable film may have a heat shrinkage rate of 40% or more in the main shrinkage direction upon thermal treatment at a temperature of 90° C. for 10 seconds. For example, the heat shrinkable film may have a heat shrinkage rate of 45% or more, 50% or more, 55% or more, 40% to 80%, 45% to 80%, 50% to 78%, 55% to 78%, or 59% to 76%, in the main shrinkage direction upon thermal treatment at a temperature of 90° C. for 10 seconds. If the above range is satisfied, it is easy to attach and label the heat shrinkable film on the surface of a container.

In addition, the heat shrinkable film may have a heat shrinkage rate of −10% to 10% in the direction perpendicular to the main shrinkage direction upon thermal treatment at a temperature of 90° C. for 10 seconds. For example, the heat shrinkable film may have a heat shrinkage rate of −5% to 8%, −3% to 6%, −1% to 5%, −0.5% to 4%, 0% to 2.5%, or 0.1% to 2%, in the direction perpendicular to the main shrinkage direction upon thermal treatment at a temperature of 90° C. for 10 seconds.

The heat shrinkable film may have a heat shrinkage rate of 45% to 85% in the main shrinkage direction upon thermal treatment at a temperature of 100° C. for 10 seconds. For example, the heat shrinkable film may have a heat shrinkage rate of 50% to 83%, 60% to 80%, or 65% to 78%, in the main shrinkage direction upon thermal treatment at a temperature of 100° C. for 10 seconds. If the above range is satisfied, it is easy to attach and label the heat shrinkable film on the surface of a container.

In addition, the heat shrinkable film may have a heat shrinkage rate of −10% to 10% in the direction perpendicular to the main shrinkage direction upon thermal treatment at a temperature of 100° C. for 10 seconds. For example, the heat shrinkable film may have a heat shrinkage rate of −5% to 8%, −2% to 6%, 0% to 5%, 1% to 4%, or 2% to 3.2%, in the direction perpendicular to the main shrinkage direction upon thermal treatment at a temperature of 100° C. for 10 seconds.

According to an embodiment, the heat shrinkable film has a melting point of 190° C. or higher as measured by differential scanning calorimetry. For example, the heat shrinkable film may have a melting point of 185° C. or higher, 180° C. or higher, 175° C. or higher, as measured by differential scanning calorimetry. In addition, the heat shrinkable film may have a melting point of 190° C. to 230°

C., 193° C. to 220° C. 195° C. to 215° C., 195° C. to 210° C., or 198° C. to 205° C., as measured by differential scanning calorimetry. Specifically, if the above range is satisfied, the clumping fraction can be effectively reduced in the subsequent process.

According to an embodiment, the peak temperature (Tp) is 95° C. to 115° C. as measured in the endothermic and exothermic curve (heat flow) by differential scanning calorimetry. For example, the peak temperature (Tp) may be 95° C. to 110° C., 96° C. to 105° C., 98° C. to 103° C., or 99° C. to 103° C.

Specifically, the first endothermic temperature measured in the endothermic and exothermic curve (heat flow) obtained using a differential scanning calorimeter refers to the glass transition temperature (Tg), and the second endothermic temperature measured after the Tg refers to the melting point (Tm). In addition, the highest temperature among the points at which the slope of the contact was "0" below the Tm, more specifically, between the Tg and the Tm, refers to the peak temperature (Tp).

As the peak temperature (Tp) of the heat shrinkable film is adjusted within the above range, the heat shrinkable film is effectively controlled in crystallinity, whereby it is possible to enhance the seaming characteristics as adhesive strength by a solvent.

In order to enhance the recyclability of a polyester-based heat shrinkable film, a method of adjusting the composition of the film may be used. In this case, when the polyester film is applied to gravure printing, UV curing printing, and variable sleeve offset printing (VSOP), the adhesive strength by a solvent is low due to its high crystallinity, making it unsuitable for a heat shrinkage process and a seaming process.

However, as the heat shrinkable film according to an embodiment is adjusted within the preferred ranges of melting point and peak temperature, it is excellent in peel strength, that is, adhesive strength after the seaming process, whereby it is suitable for application as a heat shrinkable film. Since the clumping fraction of regenerated polyester chips manufactured using it is very low, it is possible to enhance the recyclability while preventing environmental pollution.

According to an embodiment, the crystallization temperature of the heat shrinkable film is not measured or may be 70° C. to 95° C. by differential scanning calorimetry. For example, the crystallization temperature of the heat shrinkable film may be 70° C. to 93° C., 75° C. to 93° C., or 75° C. to 90° C. by differential scanning calorimetry. In such an event, the clumping fraction can be effectively reduced in the subsequent process.

According to an embodiment, the heat of crystallization of the heat shrinkable film may not be measured or may be 0.01 to 50 J/g by differential scanning calorimetry. For example, the heat of crystallization of the heat shrinkable film may be 0.01 to 40 J/g, 0.05 to 30 J/g, 0.1 to 20 J/g, 0.1 to 10 J/g, 0.1 to 8 J/g, or 0.1 to 5 J/g by differential scanning calorimetry. In such an event, the clumping fraction can be effectively reduced in the subsequent process.

Specifically, if the melting point of the heat shrinkable film is 190° C. or higher and if the crystallization temperature and the heat of crystallization are not measured by differential scanning calorimeter, the effect of reducing the clumping fraction may be the most excellent.

In addition, the heat shrinkable film may have a peel strength of 150 gf/3 cm or more. For example, the peel strength of the heat shrinkable film may be 150 gf/3 cm or more, 200 gf/3 cm or more, 250 gf/3 cm or more, 300 gf/3 cm or more, 350 gf/3 cm or more, 400 gf/3 cm or more, 150 gf/3 cm to 2,000 gf/3 cm, 200 gf/3 cm to 2,000 gf/3 cm, 250 gf/3 cm to 2,000 gf/3 cm, 300 gf/3 cm to 2,000 gf/3 cm, 350 gf/3 cm to 2,000 gf/3 cm, or 400 gf/3 cm to 2,000 gf/3 cm. Since the peel strength is adjusted within the above range, the heat shrinkable film has excellent seaming characteristics as adhesive strength by a solvent and is suitable for use in a seaming process.

The peel strength may be measured using two sheets of the heat shrinkable film (i.e., a first heat shrinkable film and a second heat shrinkable film). Specifically, 1,3-dioxolane is applied to one side of a first heat shrinkable film in the form of a band having a width of 2 mm and a length of 30 mm to form an adhesive part, and a second heat shrinkable film is laminated on the first heat shrinkable film on which the adhesive part has been formed. In such an event, the second heat shrinkable film is immediately laminated while 1,3-dioxolane is applied. A pressure of 160 Pa is applied to the adhesive part for 1 hour for aging, and the maximum force is then measured as the peel strength when the first and second heat shrinkable films are delaminated at a speed of 300 mm/min and an angle of 180°.

In addition, the heat shrinkable film may have a clumping fraction of 8% or less. Specifically, when the flakes obtained by crushing a polyethylene terephthalate (PET) container provided with the heat shrinkable film are subjected to thermal treatment at 200° C. to 220° C. for 60 minutes to 120 minutes, the clumping fraction may be 6% or less, 5% or less, 4% or less, 3.5% or less, 3% or less, 2% or less, 1% or less, or 0.5% or less.

According to an embodiment, the rate of increase in the heat shrinkage rate in the main shrinkage direction in the temperature range of 0.35×Tm° C. to 0.40×Tm° C. may be 2.5%/° C. to 4.0%/° C., and the rate of increase in the heat shrinkage rate in the main shrinkage direction in the temperature range of 0.45×Tm° C. to 0.50×Tm° C. may be 0.1%/° C. to 1.0%/° C.

In addition, the rate of increase in the heat shrinkage rate in the main shrinkage direction in the temperature range of 0.85×Tc° C. to 1.00×Tc° C. may be 2.5%/° C. to 4.0%/° C., and the rate of increase in the heat shrinkage rate in the main shrinkage direction in the temperature range of 1.12×Tc° C. to 1.27×Tc° C. may be 0.11%/° C. to 1.0%/° C.

According to an embodiment, the heat shrinkable film may have a haze of 10% or less. For example, the heat shrinkable film may have a haze of 8% or less, 7% or less, or 5% or less.

According to an embodiment, the heat shrinkable film may thickness of 30 to 100 μm. For example, the heat shrinkable film may have a thickness of 30 to 95 μm or 35 to 90 μm. If the above range is satisfied, the shrinkage uniformity is excellent.

Process for Preparing a Heat Shrinkable Film

A heat shrinkable film may be prepared from the copolymerized polyester resin composition.

Specifically, the copolymerized polyester resin composition is melt-extruded at 260° C. to 300° C. or 270° C. to 290° C. through a T-die and then cooled to obtain an unstretched sheet. The unstretched sheet is passed through rolls while it is conveyed at a speed of 10 m/min to 110 m/min or 50 m/min to 90 m/min, preheated, and then stretched to obtain a stretched sheet, which is thermally treated to prepare a heat shrinkable film.

The preheating may be carried out at 90° C. to 120° C. for 0.01 to 1 minute. For example, the preheating temperature (T1) may be 95° C. to 115° C. or 97° C. to 113° C., and the preheating time may be 0.05 minute to 0.5 minute or 0.08 minute to 0.2 minute. But they are not limited thereto.

The stretching may be carried out at a temperature lower than the preheating temperature (T1) by at least 20° C. in a first direction or in a second direction perpendicular to the first direction by 3 to 5 times. For example, the stretching may be carried out at a stretching temperature of 60° C. to 90° C., 70° C. to 90° C., or 80° C. to 90° C., in a first direction or in a second direction perpendicular to the first direction by 3 to 4.5 times, 3.5 to 4.5 times, or 4 to 4.5 times. But it is not limited thereto.

In this specification, the first direction may be the longitudinal direction, and the second direction may be the transverse direction. Alternatively, the first direction may be the transverse direction, and the second direction may be the longitudinal direction.

The thermal treatment may be carried out at 70° C. to 95° C. for 0.01 to 1 minute. For example, the thermal treatment temperature (T2) may be 70° C. to 90° C., 70° C. to 88° C., or 75° C. to 88° C., and the thermal treatment time may be 0.05 to 0.5 minute or 0.08 to 0.2 minute. But it is not limited thereto.

According to an embodiment, the preheating temperature (T1)—the thermal treatment temperature (T2) may be 10 to 40° C. For example, T1-T2 may be 13° C. to 35° C., 11° C. to 34° C., 15° C. to 34° C., or 20° C. to 34° C. If the above range is satisfied, the shrinkage rate in the main shrinkage direction and the heat shrinkage rate in the direction perpendicular to the main shrinkage direction may be effectively controlled.

Process for Regenerating a Polyester Container

According to an embodiment, there is provided a process for regenerating a polyester container, which comprises preparing the polyester container provided with the heat shrinkable film; crushing the container provided with the heat shrinkable film to obtain flakes; and thermally treating the flakes to produce regenerated polyester chips, wherein the flakes comprise first flakes obtained by crushing the container and second flakes obtained by crushing the heat shrinkable film.

FIG. 1 schematically depicts a process for regenerating a polyester container according to an embodiment. Specifically, FIG. 1 illustrates (1) preparing a polyester container provided with a heat shrinkable film; (2) crushing the container provided with the heat shrinkable film to obtain flakes; and (3) thermally treating the flakes to produce regenerated polyester chips.

Step (1)

In step (1), a polyester container provided with a heat shrinkable film is prepared. Specifically, in step (1), a waste polyester container provided with a heat shrinkable film is prepared.

The description on the heat shrinkable film is as described above.

In the polyester container provided with the heat shrinkable film, the heat shrinkable film may be provided on the outer surface of the polyester container. Specifically, the outer surface of the container is covered with the heat shrinkable film, and the heat shrinkable film may be shrunk by steam or hot air to wrap the outer surface of the container.

In such an event, the heat shrinkable film may have an ink layer formed by a process such as printing before the heat shrinkage.

According to an embodiment, the container may comprise at least 90% by weight of the polyester resin based on the total weight of the container. Specifically, the container may be a container that comprises polyethylene terephthalate and may comprise polyethylene terephthalate in an amount of 90% by weight or more, 95% by weight or more, or 99% by weight or more, based on the total weight of the container.

In general, recycled waste products are intermingled with containers, metals, glass, and plastics. Once the waste products are washed, polyester containers are classified. Then, the container may be subject to a process in which the film covering the container is mechanically torn or cut to be removed. In such an event, the quality of the regenerated polyester chips to be produced may be deteriorated due to the residual film and the ink layer formed on the residual film.

In contrast, it is possible to produce regenerated polyester chips from a container provided with a heat shrinkable film according to the embodiment even without an additional process of removing a film. Thus, time and cost are saved.

Step (2)

In step (2), the container provided with the heat shrinkable film is crushed to obtain flakes. The polyester container classified in the above step (1) comprises a heat shrinkable film, which may be crushed to obtain flakes. In such an event, the flakes comprise first flakes obtained by crushing the container and second flakes obtained by crushing the heat shrinkable film.

According to an embodiment, the particle size of the first flakes may be 0.1 to 20 mm, and the particle size of the second flakes may be 0.1 to 20 mm. For example, the particle size of the first flakes may be 0.5 to 15 mm, 1 to 15 mm, or 2 to 10 mm, and the particle size of the second flakes may be 0.5 to 15 mm, 1 to 15 mm, or 2 to 10 mm.

According to an embodiment, the flakes may be washed with a 0.5% to 3% aqueous solution of NaOH at 80° C. to 97° C. for 5 minutes to 30 minutes. A part or all of the ink layer remaining in the flakes may be removed by carrying out the washing.

According to an embodiment, the flakes may be dried at 60° C. to 175° C. for 10 minutes to 30 minutes after the washing step.

Step (3)

In step (3), the flakes are thermally treated to produce regenerated polyester chips.

The thermal treatment may be carried out at 200° C. to 220° C. for 60 minutes to 120 minutes. For example, it may be carried out at 200° C. to 215° C. or 205° C. to 220° C. for 70 minutes to 120 minutes or 80 minutes to 120 minutes.

Regenerated polyester chips that comprise the flakes may be obtained after the thermal treatment step. Specifically, regenerated polyester chips that comprise the first flakes and the second flakes may be obtained. For example, the flakes may be melt-extruded and cut to obtain regenerated polyester chips.

Regenerated Polyester Chips

According to an embodiment, the regenerated polyester chips may have an intrinsic viscosity (IV) of 0.60 dl/g or more. For example, the regenerated polyester chips may have an intrinsic viscosity (IV) of 0.63 dl/g or more, 0.65 dl/g or more, 0.70 dl/g or more, 0.75 dl/g or more, 0.60 to 3.00 dl/g, 0.60 to 2.0 dl/g, or 0.65 to 1.0 dl/g.

According to an embodiment, when the flakes are thermally treated at a temperature of 200° C. to 220° C. for 60 minutes to 120 minutes, the clumping fraction may be 8% or less. For example, when the flakes are thermally treated at a temperature of 200° C. to 220° C. for 60 minutes to 120 minutes, the clumping fraction may be 6% or less, 5% or less, 4% or less, 3.5% or less, 3% or less, 2% or less, 1% or less, or 0.5% or less. Specifically, the clumping fraction refers to the fraction of aggregates based on the total weight of the flakes. For example, the flakes may be passed through a sieve and thermally treated. Then, the aggregates, which are entangled flakes, may be passed through a sieve again to be separated. In such an event, the sieves used can be the same size. That is, the clumping fraction can be measured as a percentage of the aggregate content based on the thermally treated flakes.

In addition, the higher the value of the crumbling fraction is, the more the first flakes and the second flakes are entangled together to lower the quality of the regenerated chips. For example, the size of the aggregates may be at least three times the particle size of the flakes. The second flakes are obtained by crushing the heat shrinkable film according to the embodiment, thereby effectively reducing or preventing the clumping phenomenon and enhancing the quality of the regenerated polyester chips.

According to an embodiment, the regenerated polyester chips may comprise first flakes that comprise polyethylene terephthalate and second flakes that comprise a copolymerized polyester resin.

According to an embodiment, the regenerated polyester chips may comprise 70 to 99% by weight of polyethylene terephthalate and 1 to 30% by weight of a copolymerized polyester resin based on the total weight of the regenerated polyester chips. For example, the regenerated polyester chips may comprise 80 to 99% by weight, 90 to 99% by weight, or 95 to 99% by weight of polyethylene terephthalate and 1 to 28% by weight or 3 to 25% by weight of a copolymerized polyester resin based on the total weight of the regenerated polyester chips.

According to an embodiment, the copolymerized polyester resin may comprise neopentyl glycol in an amount of 5 to 35% by mole based on the total number of moles of the diol component and terephthalic acid in an amount of at least 90% by mole based on the total number of moles of the dicarboxylic acid component. For example, the copolymerized polyester resin may comprise neopentyl glycol in an amount of 5 to 30% by mole, 10 to 30% by mole, or 10 to 25% by mole, based on the total number of moles of the diol component and terephthalic acid in an amount of at least 93% by mole, at least 95% by mole, at least 98% by mole, or at least 99% by mole, based on the total number of moles of the dicarboxylic acid component.

According to an embodiment, the copolymerized polyester resin may comprise ethylene glycol in an amount of 55 to 93% by mole and diethylene glycol in an amount of 2 to 10% by mole based on the total number of moles of the diol component. For example, the copolymerized polyester resin may comprise ethylene glycol in an amount of 60 to 90% by mole, 65 to 90% by mole, or 65 to 85% by mole and diethylene glycol in an amount of 2 to 8% by mole or 3 to 8% by mole based on the total number of moles of the diol component.

Embodiments for Carrying Out the Invention

Hereinafter, the present invention will be described in more detail with reference to the following examples. However, these examples are set forth to illustrate the present invention, and the scope of the present invention is not limited thereto.

EXAMPLE

Ex. 1

Preparation of a Copolymerized Polyester Resin

A stainless steel autoclave equipped with a stirrer, a thermometer, and a partial reflux condenser was charged with 100% by mole of dimethyl terephthalate (DMT), 78% by mole of ethylene glycol (EG), 17% by mole of neopentyl glycol (NPG), and 5% by mole of diethylene glycol (DEG). 0.05% by mole (based on the acid component) of zinc acetate as a transesterification catalyst was added thereto. The transesterification reaction was carried out while methanol was being distilled off. Thereafter, 0.025% by mole (based on the acid component) of antimony trioxide as a polycondensation catalyst was added, and the polycondensation reaction was carried out under a reduced pressure of 26.6 Pa (0.2 Torr) at 280° C. to obtain a copolymerized polyester resin.

Preparation of a Heat Shrinkable Film

The copolymerized polyester resin was fed to an extruder and then melt-extruded at 280° C. through a T-die. Thereafter, it was wound around a rotating metal roll whose surface temperature was cooled to 30° C. to obtain an unstretched film having a thickness of 204 μm. Here, the take-up speed (rotation speed of the metal roll) of the unstretched film was 54 m/min.

The unstretched film was continuously wound around a plurality of rotating rolls to be preheated, followed by longitudinal stretching thereof 5 times in the transverse direction (TD) at 96° C.

Thereafter, the film was heat set at a temperature of 75.5° C. for 0.1 minute using an infrared heater to obtain a heat shrinkable film having a thickness of 41 μm.

Preparation of a Container Provided with a Heat Shrinkable Film

The outer surface of a polyethylene terephthalate container (PET container, 30 g) was wrapped with the heat shrinkable film (1 g) prepared above. The heat shrinkable film was shrunk in hot air at a temperature of 90° C. to obtain a container provided with a heat shrinkable film.

<Process for Regenerating a Container>

The container provided with the heat shrinkable film was crushed with a crusher to obtain flakes. The flakes were washed with water and then washed for 15 minutes with a corrosion washing solution (a mixture of a solution of 0.3% by weight of Triton X-100 and a solution of 1.0% by weight of NaOH) stirred in a bath at 85° C. to 90° C. at 880 rpm.

Thereafter, the flakes were washed with water at room temperature to remove the residual corrosion washing solution, dried at 160° C. for 20 minutes, and then thermally treated at 210° C. for 90 minutes to produce regenerated polyester chips.

Examples 2 and 3 and Comparative Examples 1 and 2

Regenerated polyester chips were prepared in the same manner as in Example 1, except that the components, contents, and heat-setting temperature were changed as shown in Table 1 below.

TABLE 1

| | DMT (% by mole) | EG (% by mole) | NPG (% by mole) | DEC (% by mole) | Stretching temp. in the transverse direction (° C.) | Heat-setting temp. (° C.) |
|---|---|---|---|---|---|---|
| Ex. 1 | 100 | 78 | 17 | 5 | 96 | 75.5 |
| Ex. 2 | 100 | 78 | 17 | 5 | 96 | 80.0 |
| Ex. 3 | 100 | 78 | 17 | 5 | 96 | 87.5 |
| C. Ex. 1 | 100 | 71 | 24 | 5 | 96 | 75.0 |
| C. Ex. 2 | 100 | 90.8 | 6.3 | 3.1 | 96 | 75.0 |

Evaluation Example

Evaluation Example 1: Evaluation of Heat Shrinkage Rates

A sample of the heat shrinkable films prepared above (300 mm×15 mm) was immersed in a water bath heated to 70° C., 80° C., 90° C., and 100° C. for 10 seconds, respectively. After water was removed at room temperature, the heat shrinkage rate was calculated by the following equation.

Heat shrinkage rate (%)=[(300−length of film sample upon thermal treatment (mm)/300]×100

Evaluation Example 2: Evaluation of Tg, Tm, and Tp

The endotherm and exotherm of the heat shrinkable films (10 mg) prepared above were each measured with Differential Scanning Calorimetry-Mettler Toledo DSC 1 while the temperature was raised at a rate of 10° C./min from 30° C. to 250° C.

Specifically, the first endothermic temperature measured from the endothermic and exothermic curve (heat flow) obtained using a differential scanning calorimeter was the glass transition temperature (Tg), and the second endothermic temperature measured after the Tg was the melting point (Tm). In addition, the highest temperature among the points at which the slope of the contact was "0" below the Tm, specifically, between the Tg and the Tm, was the peak temperature (Tp). Here, the melting point and the peak temperature were rounded to the third decimal place.

Evaluation Example 3: Evaluation of Clumping

The flakes prepared above were passed through a 0.625"-sieve. 1 kg of the flakes thus sieved was exposed in an oven at 210° C. for 90 minutes without pressure. They were cooled to room temperature and passed through a 625"-sieve. The weight of the aggregates thus filtered was measured and calculated as a percentage of the total weight of the flakes.

Evaluation Example 4: Evaluation of Peel Strength

FIG. 5 shows a method of measuring the peel strength of a heat shrinkable film. That is, FIG. 5 shows a method of testing the seaming characteristics of a heat shrinkable film as adhesive strength by a solvent.

Specifically, first, two sample sheets (i.e., a first heat shrinkable film (100) and a second heat shrinkable film (200)) of the heat shrinkable films prepared above were each prepared in A4 size.

Thereafter, while 1,3-dioxolane was applied to one side of the first heat shrinkable film (100) in the form of a band having a width of 2 mm and a length of 30 mm to form an adhesive part (110), the second heat shrinkable film (200) was laminated on the first heat shrinkable film on which the adhesive part had been formed (see FIG. 5(a)). Here, the adhesive part (110) was formed at a position distanced by 6.5 cm (w) from the upper end of the first heat shrinkable film (100). In addition, the area of the adhesive part (110) was 60 mm².

Thereafter, in order to prevent the first heat shrinkable film and the second heat shrinkable film laminated from bending, a pressing plate (120) was placed on the second heat shrinkable film. Thereafter, a weight (130) of 2 kg was placed on the pressing plate (120) and aged for 1 hour (see FIG. 5(b)). Here, the weight (130) was placed at the position of the adhesive part (110).

Thereafter, the weight (130) and the pressing plate (120) were removed, and the first heat shrinkable film (100) and the second heat shrinkable film (200) laminated were cut into a width of 3 cm and a length of 9 cm to obtain Sample A (300) (see FIG. 5(c)).

Thereafter, when the first heat shrinkable film (100) and the second heat shrinkable film (200) in Sample A (300) were delaminated at a speed of 300 mm/min and an angle of 180°, the maximum force was measured as peel strength (see FIG. 5(d)). The test described above was carried out 5 times, and the average value was calculated.

The results of Evaluation Examples 1 to 4 are shown in Table 2 below.

TABLE 2

| | Tm (° C.) | Tp (° C.) | Peel strength (gf/3 cm) | Clumping fraction (%) |
|---|---|---|---|---|
| Ex. 1 | 201.6 | 102.9 | 840 | 0.4 |
| Ex. 2 | 201.3 | 101.9 | 650 | 1.2 |
| Ex. 3 | 200.8 | 99.2 | 420 | 5.5 |
| C. Ex. 1 | 184.1 | 117.6 | 2,010 | 18.4 |
| C. Ex. 2 | 239.9 | 84.8 | 0 | 0 |

TABLE 31

| | Thermal shrinkage rate in TD (%) | | | | Thermal shrinkage rate in MD (%) | | | |
|---|---|---|---|---|---|---|---|---|
| | 70° C. | 80° C. | 90° C. | 100° C. | 70° C. | 80° C. | 90° C. | 100° C. |
| Ex. 1 | 49.5 | 71.0 | 75.1 | 77.1 | −4.1 | −1.1 | 1.5 | 3.0 |
| Ex. 2 | 27.5 | 55.9 | 70.0 | 74.1 | −1.0 | 2.7 | 0.9 | 2.6 |
| Ex. 3 | 12.4 | 45.8 | 59.5 | 65.9 | 0.0 | −0.5 | 0.4 | 2.2 |
| C. Ex. 1 | 51.5 | 77.6 | 79.5 | 81.5 | −7.2 | 0.0 | 2.8 | 3.3 |
| C. Ex. 2 | 9.7 | 36.2 | 53.9 | 54.8 | 5.8 | 6.8 | 5.5 | 9.2 |

As shown in Tables 2 and 3 above, the heat shrinkable films prepared in Examples 1 to 3 each satisfied the preferred ranges of melting point, peak temperature, peel strength, and heat shrinkage rate with respect to temperature. The regenerated polyester chips prepared by the process for regenerating a polyester container using the same had a low clumping fraction.

In particular, as the heat shrinkable films of Examples 1 to 3 each satisfied the preferred ranges of melting point and peak temperature, it was excellent in peel strength, that is, adhesive strength after the seaming process, whereby it would be suitable for application as a heat shrinkable film. Since the clumping fraction of regenerated polyester chips manufactured using it was very low, it would be possible to enhance the recyclability while preventing environmental pollution.

In contrast, as the heat shrinkable films prepared in Comparative Examples 1 and 2 each had a melting point, a peak temperature, and a peel strength falling outside the preferred ranges, the thermal characteristics and seaming characteristics were not good; and the regenerated polyester chips manufactured using the same were poor in quality as well. Specifically, since the heat shrinkable films of Comparative Examples 1 and 2 were each poor in thermal characteristics and seaming characteristics, it would be difficult to apply them to various products. Since the regenerated polyester chips manufactured using the same had a high clumping fraction, the recyclability would be poor.

The invention claimed is:

1. A heat shrinkable film, which comprises a copolymerized polyester resin comprising a diol component and a dicarboxylic acid component, and
which has a heat shrinkage rate of 30% or more in the main shrinkage direction upon thermal treatment at a temperature of 80° C. for 10 seconds,
a melting point of 190° C. or higher as measured by differential scanning calorimetry, and
a peak temperature (Tp) of 95° C. to 115° C. as measured in the endothermic and exothermic curve (heat flow) by differential scanning calorimetry.

2. The heat shrinkable film of claim 1, which has a clumping fraction of 8% or less.

3. The heat shrinkable film of claim 1, which has a crystallization temperature that is not measured or is 70° C. to 95° C. by differential scanning calorimetry.

4. The polyester film of claim 1, which has a heat of crystallization at the crystallization temperature that is not measured or is 0.01 to 50 J/g.

5. The heat shrinkable film of claim 1, wherein the diol component is at least one selected from the group consisting of ethylene glycol, diethylene glycol, neopentyl glycol, and cyclohexanedimethanol.

6. The heat shrinkable film of claim 1, wherein the copolymerized polyester resin comprises neopentyl glycol in an amount of 5 to 35% by mole based on the total number of moles of the diol component.

7. The heat shrinkable film of claim 1, which has a heat shrinkage rate of 5% to 55% in the main shrinkage direction upon thermal treatment at a temperature of 70° C. for 10 seconds,
wherein the rate of increase in the heat shrinkage rate in the main shrinkage direction in the temperature range of 0.35×Tm° C. to 0.40×Tm° C. is 2.5%/° C. to 4.0%/° C., and
the rate of increase in the heat shrinkage rate in the main shrinkage direction in the temperature range of 0.45× Tm° C. to 0.50×Tm° C. is 0.1%/° C. to 1.0%/° C.

8. A process for regenerating a polyester container, which comprises:
preparing a polyester container provided with the heat shrinkable film according to claim 1;
crushing the container provided with the heat shrinkable film to obtain flakes; and
thermally treating the flakes to produce regenerated polyester chips,
the flakes comprise first flakes obtained by crushing the container and second flakes obtained by crushing the heat shrinkable film.

9. The process for regenerating a polyester container of claim 1, wherein when the flakes are thermally treated at a temperature of 200° C. to 220° C. for 60 minutes 120 minutes, the clumping fraction is 8% or less.

* * * * *